United States Patent
Hata et al.

(10) Patent No.: US 7,065,711 B2
(45) Date of Patent: Jun. 20, 2006

(54) INFORMATION PROCESSING DEVICE AND METHOD, AND RECORDING MEDIUM

(75) Inventors: Katsushige Hata, Tokyo (JP); Tsuyoshi Ono, Tokyo (JP)

(73) Assignee: Sony Corporation, Tokyo (JP)

( * ) Notice: Subject to any disclaimer, the term of this patent is extended or adjusted under 35 U.S.C. 154(b) by 509 days.

(21) Appl. No.: 10/037,160

(22) Filed: Dec. 20, 2001

(65) Prior Publication Data

US 2002/0109719 A1    Aug. 15, 2002

(30) Foreign Application Priority Data

Dec. 20, 2000    (JP) .......................... P2000-386395

(51) Int. Cl.
*G06F 15/00*    (2006.01)
(52) U.S. Cl. ...................... 715/758; 715/835; 715/856
(58) Field of Classification Search ............... 345/806, 345/802, 263, 265, 262; 715/758, 835, 856, 715/763, 765, 854, 853

See application file for complete search history.

(56) References Cited

U.S. PATENT DOCUMENTS 5,880,731 A * 3/1999 Liles et al. .................. 345/758
6,064,383 A * 5/2000 Skelly ........................ 715/758

* cited by examiner

*Primary Examiner*—Cao (Kevin) Nguyen
(74) *Attorney, Agent, or Firm*—Bell, Boyd & Lloyd LLC (57) ABSTRACT

An information processing device and method, and a recording medium for enabling several users to participate as respective avatars in a virtual space constructed on a network and to have conversations with other users. The data regarding the feeling expressions of an avatar, which correspond to a user's conditions, are managed. Then, the image displays of the avatar are controlled based on the storage of data on the image displays.

27 Claims, 13 Drawing Sheets

GLAD

FIG. 6B

ANGRY

FIG. 6C

SAD

FIG. 6D

JOYFUL

FIG. 6E

BITTER

INFORMATION PROCESSING DEVICE AND METHOD, AND RECORDING MEDIUM

BACKGROUND OF THE INVENTION

The present invention relates to an information processing device and method, and a recording medium, and particularly to an information processing device and method and a recording medium which are suitably used when communications are carried out in virtual space using avatars.

There exists such a service that plural users can connect their computers to servers through the Internet to co-own a three-dimensional virtual space (hereinafter referred to as "virtual space"). According to such a service, in the virtual space, each user can move an imitation of a user (a character corresponding to an object expressing the user himself/herself) called an avatar. Furthermore, users meeting in the virtual space can chat or communicate with each other. A communication terminal which transmits/receives a message such as a chat or the like enables a user's character having an outlook like a doll, such as an animal or the like, to enter the virtual space as an avatar to have conversations with others.

A technique of enabling users to chat with others by using avatars in virtual space is being applied to various fields. For example, this technique is applied in the educational field such as for communication and interchange between students in schools which are far away from each other.

The types of avatars set in a virtual space are different according to the virtual space (service) that is supplied. That is, avatars differ in shape, such as avatars having animal shapes and human shapes. The avatars are prepared for a virtual space according to the style of services, and a user can select his/her favorite avatar from predetermined avatars.

In general, when persons have a conversation with each other while facing each other, the conversation progresses between the people not only with speech, but also with body gestures, hand gestures, face expressions, etc., as information for communication. Such information is mainly information on expressing feelings. In the real world, there are situations where the speech information, which is based on words, and the information based on feelings, do not coincide with each other. For example, the feeling expression and the language expression do not coincide with each other when a person sets forth his/her rejection with words although he/she looks like they are laughing. Of course, there are many cases where the language expression and the feeling expression do coincide with each other.

Such a case (i.e., case where there is an inconsistency between the feeling expression and the language expression) is used as a method of smoothly progressing communications (i.e., social skill). However, a problem exists where the avatars cannot make such a feeling expression in virtual space. In other words, a user can select his/her favorite avatar as described above, but, the avatars that belong to the same type are not prepared to have different feeling expressions from one another. Therefore, an avatar, which is selected once by a user, always has the same feeling expression irrespective of the content of a chat or communication. Thus, information on feeling expressions that is needed to perform smooth communications between avatars cannot be supplied.

SUMMARY OF THE INVENTION

The present invention has been implemented in view of the above situation, and has an object to enable one kind of avatar to make plural feeling expressions so that smooth communications can be performed by using avatar in virtual space.

In order to attain the above object, according to an aspect of the present invention, an information processing device is provided which includes a manager for managing data on feeling expressions of an avatar which correspond to user's conditions; a storage area for storing data on image displays of the avatar which correspond to the feeling expressions; and a display controller for controlling the image displays of the avatars based on the data stored in the storing area.

In the above information processing device, the avatar exists in a virtual space constructed on a network, and the data on the feeling expressions managed by the manager are set when a user enters the virtual space.

In the above information processing device, the data managed by the manager are set in accordance with living body information of the user or various expressions of the user.

The above information processing device further includes a voice controller for controlling the tone of voices uttered from the avatar based on the data stored in the storing area.

In the above information processing device, the manager manages the data on the feeling expressions based on a table in which the types of feelings and the levels thereof are associated with one another.

In the above information processing device, the display controller controls a display including a motion picture of the avatar.

According to another aspect of the present invention, an information processing method is provided for enabling plural users to participate as respective avatars in a virtual space constructed on a network and have conversations with other users, the method including: a managing step of managing data on feeling expressions of an avatar which correspond to a user's conditions; a storage control step of controlling storage of data on image displays of the avatar which correspond to the feeling expressions; and a display control step of controlling the image displays of the avatar based on the storage of data on the image displays.

In an embodiment, the above information processing method further includes a step of controlling the data on the feeling expressions of the avatar based on the voices uttered by the avatar.

According to another aspect of the present invention, a recording medium is provided in which an information processing program is stored for executing the following steps in order to enable plural users to participate as respective avatars in a virtual space constructed on a network: a managing step of managing data on feeling expressions of an avatar which correspond to a user's conditions; a storage control step of controlling storage of data on image displays of the avatar which correspond to the feeling expressions; and a display control step of controlling the image displays of the avatar based on the storage of data on the image displays.

According to another aspect of the present invention, a program is provided for implementing the following functions in a virtual space constructed on a network in which plural users participate as respective avatars: a managing function of managing data on feeling expressions of an avatar which correspond to a user's conditions; a storage control function of controlling storage of data on image displays of the avatar which correspond to the feeling expressions; and a display control function of controlling the image displays of the avatar based on the storage of data on the image displays.

According to another aspect of the present invention, a character device is provided and used in connection with a communication terminal device which jointly uses a virtual space with other communication terminal devices, the device including: communication parts for transmitting/receiving control commands to vary expressions of the character device or voices uttered by the character device; and a controller for controlling the expressions of the character device or the voices uttered by the character device based on the control commands received by the character device.

In the above character device, the expressions or voices of the character device are controlled based on the living body information of a user who enters the virtual space.

In the above character device, an image display or voices are controlled by receiving data on the character device that are associated with the living body information.

In the above character device, the expressions or voices of the character device are controlled by receiving data on the variation of the user's expressions which result from communications in the virtual space.

In the above character device, the controller controls the action of the character.

Additional features and advantages of the present invention are described in, and will be apparent from, the following Detailed Description of the Invention and the Figures.

DETAILED DESCRIPTION OF THE INVENTION

Figure 1:
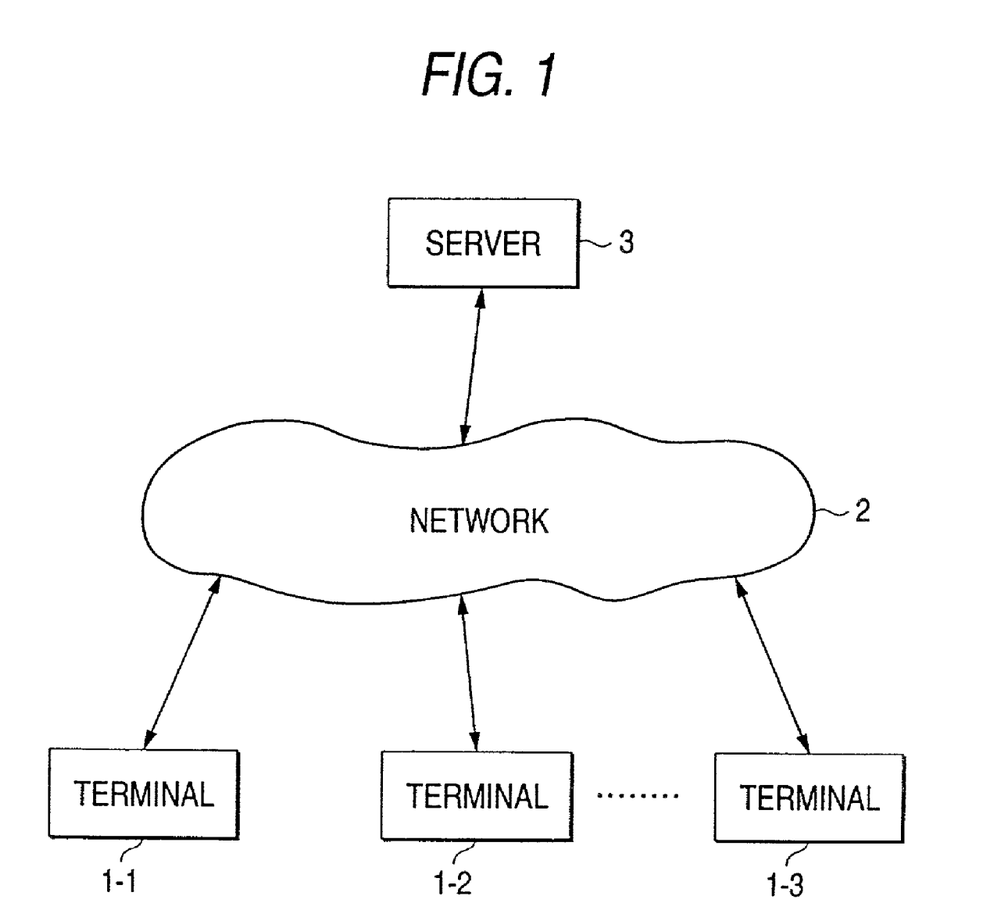
FIG. 1 is a diagram showing an embodiment of a system according to the present invention.

FIG. 1 is a diagram showing the construction of an embodiment of a system to which the present invention is applied.

Terminals 1-1 to 1-N are terminals at user sides. These terminals are connected to a network 2 represented by the Internet to perform data communications with a server 3. Each terminal 1-1 to 1-N (when it is unnecessary to discriminate the terminals 1-1 to 1-N from one another, they are merely referred to as "terminal 1") is constructed by a personal computer, a cellular phone or the like.

The server 3 is provided to manage the virtual space. The user of terminal 1 is allowed to move his/her incarnation (avatar) in the virtual space by using terminal 1.

Figure 2:
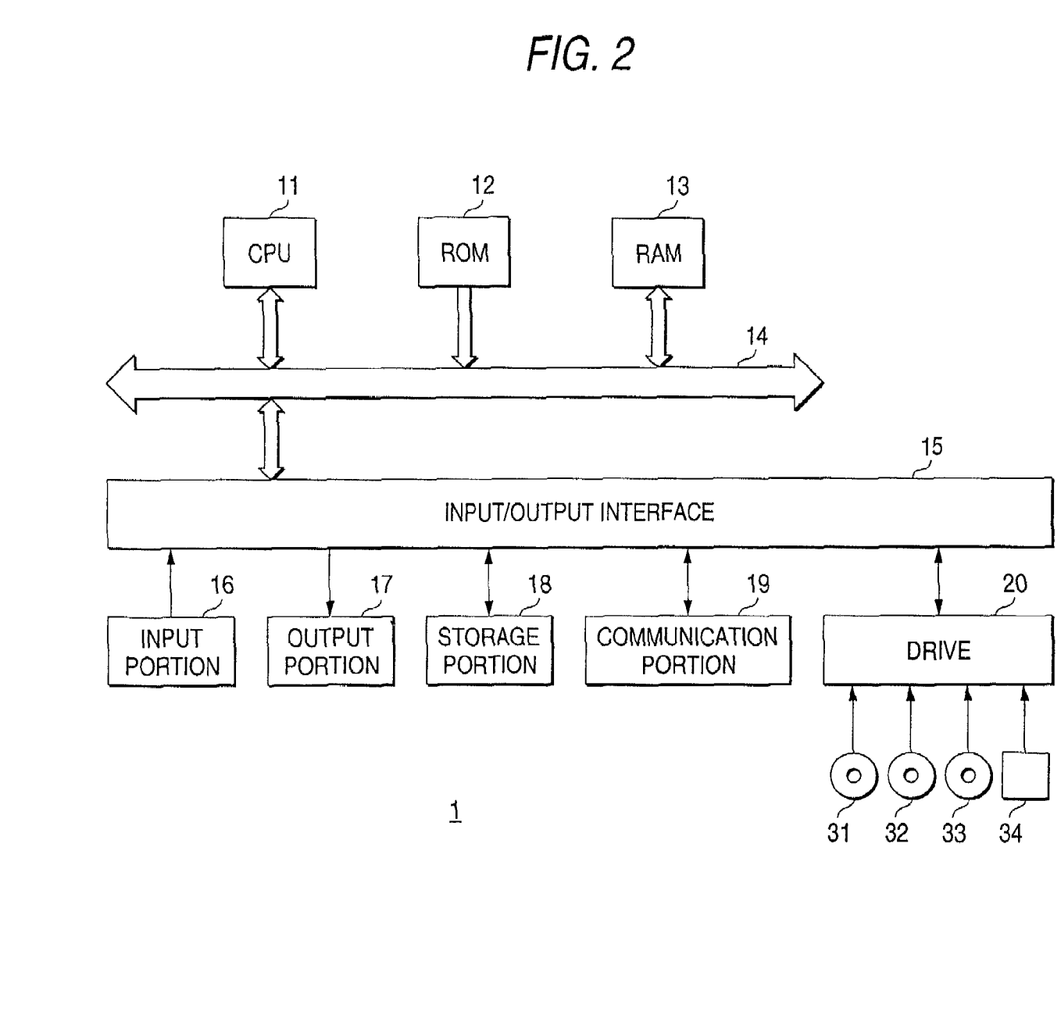
FIG. 2 is a diagram showing the internal construction of a terminal shown in FIG. 1.

FIG. 2 is a diagram showing the internal construction of terminal 1.

The CPU (Central Processing Unit) 11 of terminal 1 executes various processing operations according to programs stored in ROM (Read Only Memory) 12. Data and programs needed to execute the various processing operations by CPU 11 are stored in RAM (Random Access Memory) 13 as occasion demands. An input/output interface 15 is connected to an input portion 16 including a keyboard and a mouse, and signals input to the input portion 16 are output from the input/output interface 15 to CPU 11. The input/output interface 15 is connected to an output portion 17 including a display, a speaker, etc.

The input/output interface 15 is also connected to a storage portion 18 including a hard disk or the like and a communication portion 19 for performing data communications with the server 3 through the network 2. A drive 20 is used to read/write data from/into a recording medium such as a magnetic disc 31, an optical disc 32, a magnetooptical disc 33, or a semiconductor memory 34.

The server 3 has the same basic construction as terminal 1, and thus the illustration of the construction of the server is omitted from the drawings.

Next, avatars in the virtual space will be described.

Figure 3:
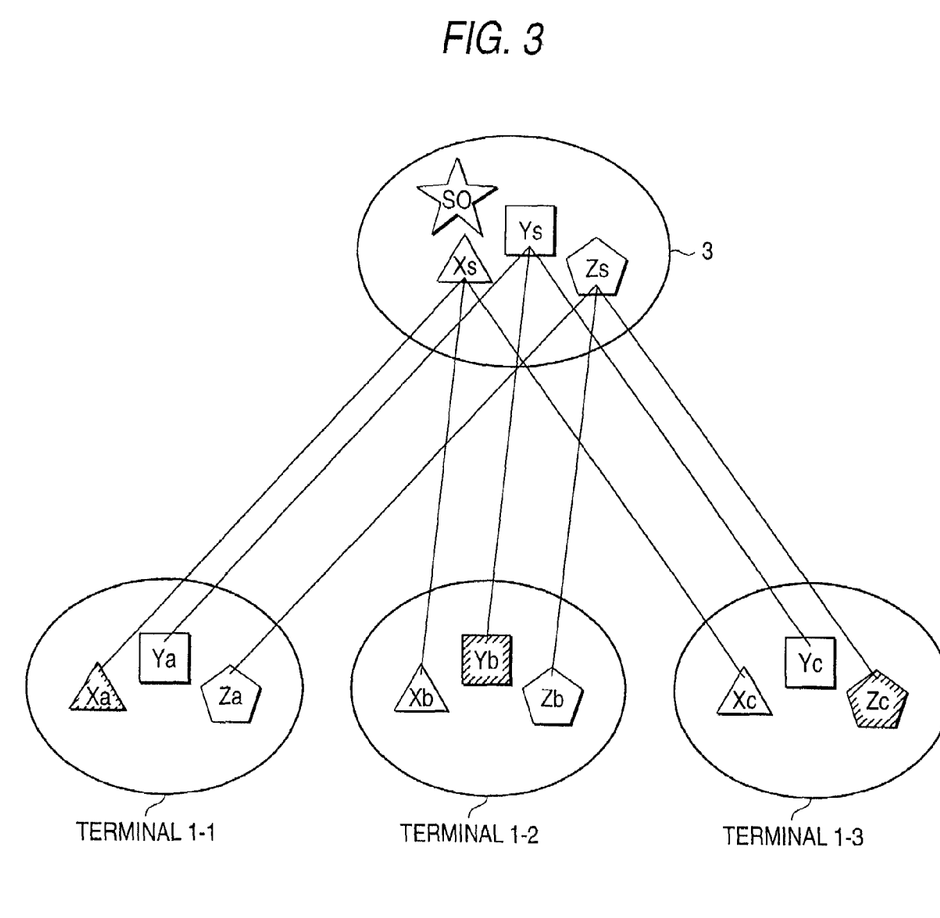
FIG. 3 is a diagram illustrating avatars communicating amongst various terminals.

In FIG. 3, it is assumed that a user A uses the terminal 1-1, a user B uses the terminal 1-2 and a user C uses the terminal 1-3. An avatar Xa as an incarnation of user A, an avatar Ya as an incarnation of user B and an avatar Zc as an incarnation of user C are displayed in the virtual space on the display as the output portion 17 of the terminal 1-1.

The user A can operate the avatar Xa as the incarnation thereof. However, user A cannot operate the other user's avatars Ya or Za. As described above, an avatar which a user can operate as an incarnation thereof, is referred to as "pilot avatar," and avatars which the user cannot operate because the avatars are incarnations of the other users, are referred to as "drone avatar." Accordingly, terminal 1 for each user displays one pilot avatar and several drone avatars.

Likewise, the drone avatar Xb of user A and the pilot avatar Yb of user B and the drone avatar Zc of user C are displayed on the display as output portion 17 of the terminal 1-2 of user B, and the drone avatar Xc of user A, the drone avatar Yc of user B and the pilot avatar Zc of user C are displayed on the display as output portion 17 of the terminal 1-3 of user C.

In order to manage the avatars of the respective users, the server 3 has the information of the avatar Xs of user A, the avatar Ys of user B and the avatar Zs of user C in the virtual space that the server manages. The avatars managed in the server 3 are called "in-server instances SI" as occasion demands. The information on the avatars contains information about the shapes, actions, attributes, positions, etc. of the avatars. In the system constructed by the terminals 1-1 to 1-3 and the server 3, the information on the avatars is used as common information in the system while a self avatar is set as a pilot avatar and the other avatars are set as drone avatars.

For example, when user A operates his/her terminal to move the pilot avatar Xa in the virtual space, the information thereof is transmitted to the server 3. On the basis of this information, the server 3 renews the position information in the virtual space of the in-server instance SI corresponding to the avatar Xs, and transmits the renewal information to the terminals 1-2 and 1-3. On the basis of the information from the server 3, each of the terminals 1-2 and 1-3 displays that the drone avatars Xb, Xc are moved in the virtual space.

The information transmitted between the server 3 and terminal 1 (among the terminals 1 through the server 3) as described above is referred to as "message." The message covers not only a message as common information to be transmitted/received to operate each avatar as described above, but also a system message to manage the system. A system object SO exists as an object to process such a system message in the virtual space that the server 3 manages.

For example, when a prescribed avatar (user) makes a request for search processing on other avatars in the virtual space or the like, the system object SO serves to execute the search processing or the like.

Figure 4:
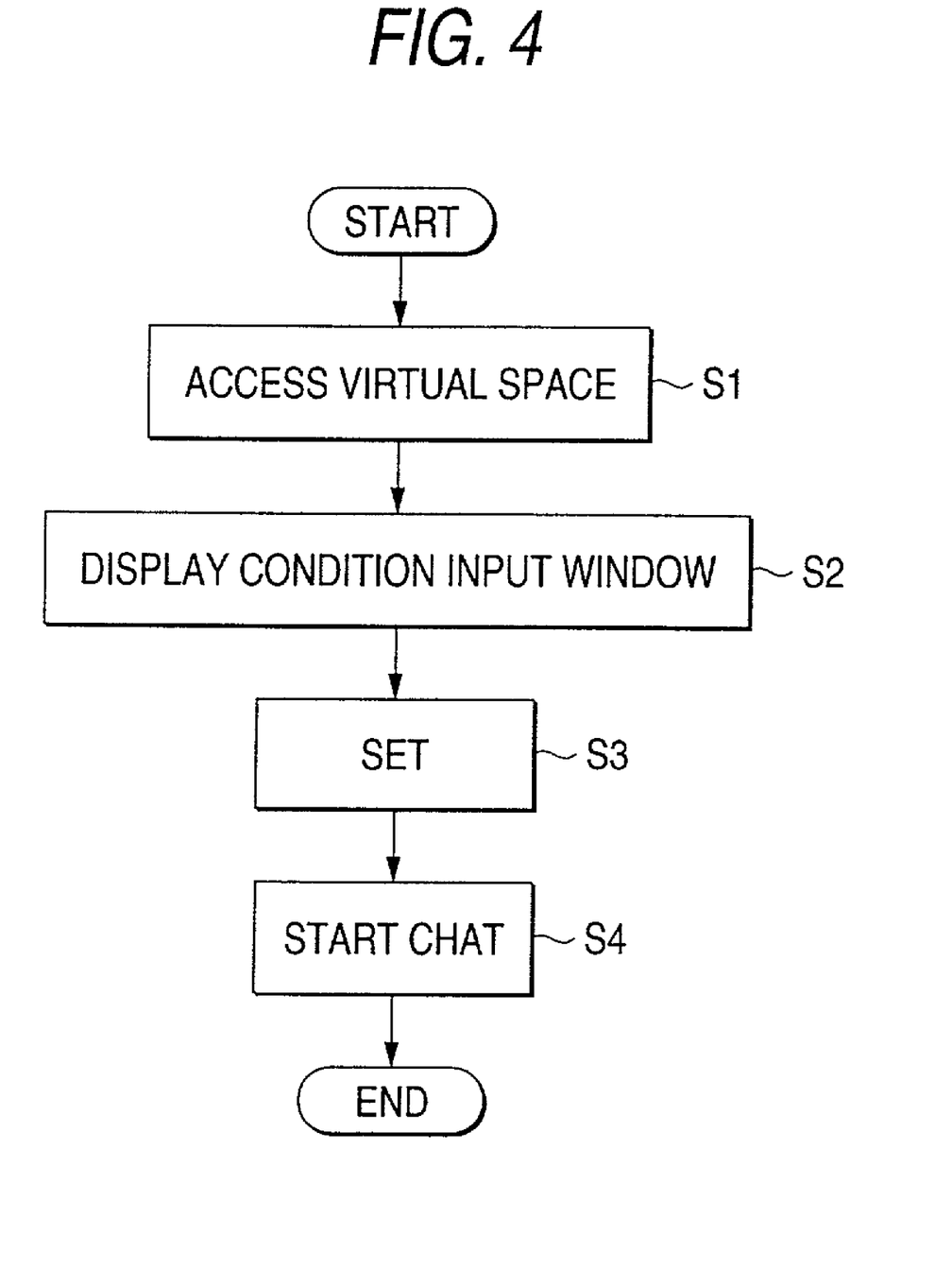
FIG. 4 is a flowchart showing the executed operation until a chat is performed.

Referring to FIG. 4, a flowchart illustrates a case where a user accesses the virtual space supplied by such a system to enjoy a chat or communication with other users.

In step S1, the user carries out a predetermined operation to connect his/her terminal 1 to the server 3 through the network 2, thereby accessing the virtual space.

When access to the virtual space is completed, a condition input window is displayed on the display which serves as the output portion 17 of the terminal 1 in step S2. The condition input window is a window for inputting the conditions (physical condition, feeling, etc.) at that point in time, and has a shape as shown in FIG. 5.

Figure 5:
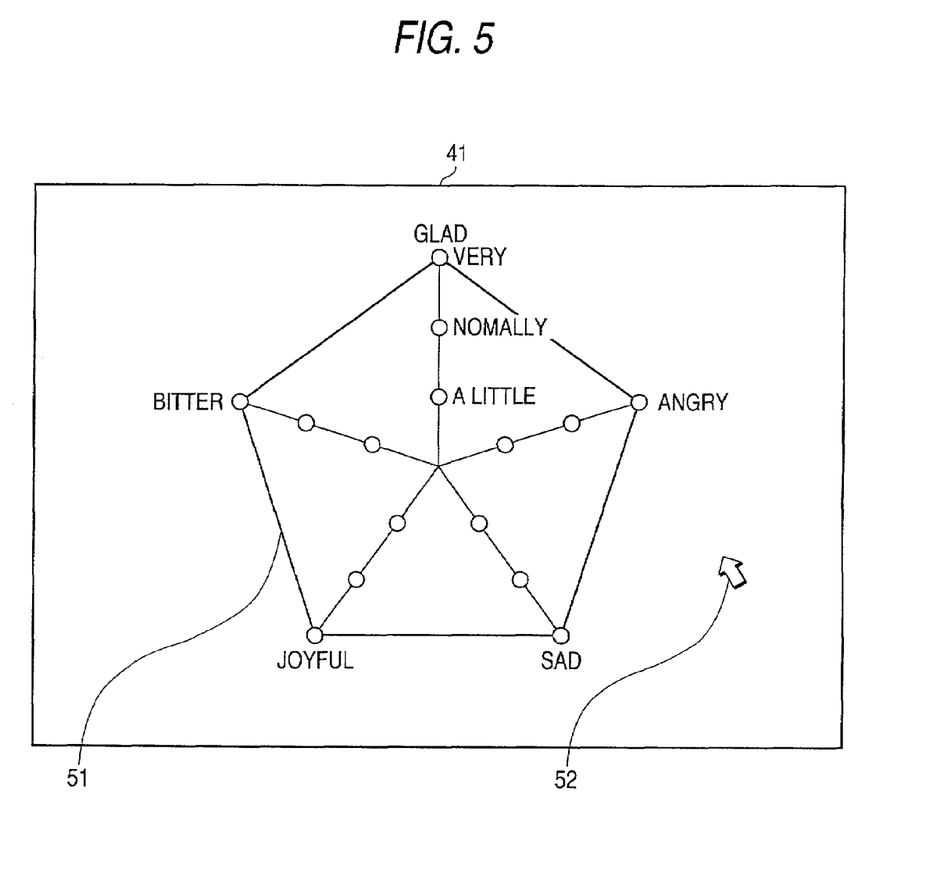
FIG. 5 is a diagram showing a condition input window 51.

FIG. 5 shows an example of the condition input window 51 displayed on display 41.

In the case of FIG. 5, five conditions such as "glad," "angry," "sad," "joyful" and "bitter" are set as the conditions of the condition input window 51. Furthermore, three levels such as "very," "normally" and "a little" are assigned to each of the conditions.

A user sets a cursor 52 to the most suitable condition at that point in time by operating a mouse (not shown) as the input portion 16. Since the five conditions and the three levels assigned to each condition are set as shown in FIG. 5, fifteen (15) buttons, which equals the five conditions multiplied by the number of levels for each condition, are displayed. These buttons include radio buttons, for example, and each button is set to be on-state (black-dot state) when the mouse is subjected to a predetermined operation such as click under the state that the cursor 52 is located at the button concerned, and set to be off-state (white circle) when the same operation is carried out again. However, only one of the fifteen buttons is set to the on-state.

The condition input window 51 shown in FIG. 5 is an example, and the number of the buttons to be prepared may be equal to five or more or five or less. Further, the number of levels may be equal to three or more, or three or less. The shape of the condition input window 51 is not limited to a pentagon, and various other shapes may be used.

When the condition input window 51 as shown in FIG. 5 is displayed on the display 41 in step S2, the user checks one button in step S3. When the check is completed, the processing goes to step S4 to set the terminal to the state that the user can carry out various operations such as chats executable in the virtual space.

When the access to the virtual space is released, the condition that exists at that point in time may be stored so that the existing condition is continued when the user accesses the virtual space next time. However, the condition is usually varied every time a user accesses the virtual space, and thus it is preferable to set a condition from the condition input window 51 without continuing the condition every time the user accesses the virtual space. Furthermore, the process of selecting the type of avatar by the user may be provided before the setting of the condition from the condition input window 51 or done as a subsequent step.

The condition and the level input from the condition input window 51 affect the expression and action of the avatar when a subsequent chat or the like is carried out. FIGS. 6A to 6E show the expressions of an avatar when "very" is selected as the expression level That is, FIGS. 6A to 6E show the expressions when the level "very" is assigned to "glad," "angry," "sad," "joyful" and "bitter," respectively.

Figure 6A:
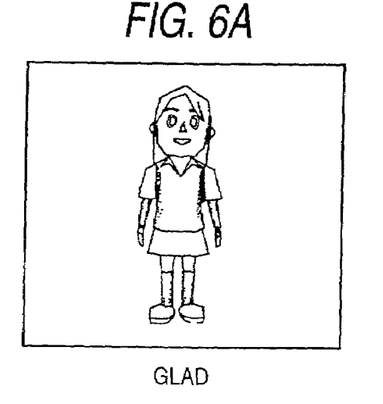
FIGS. 6A to 6E are schematic diagrams illustrating various examples of avatars displayed on a display 41.
Figure 6B:
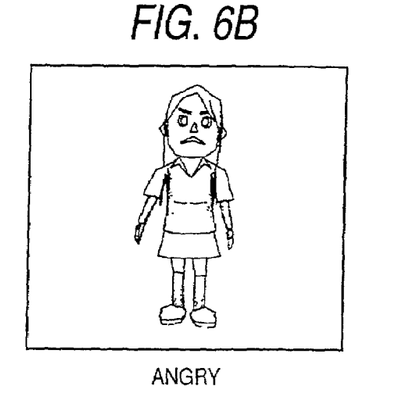
Figure 6C:
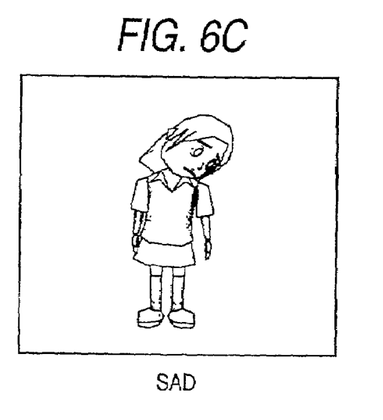
Figure 6D:
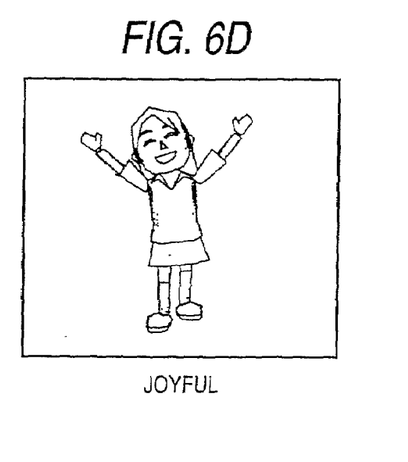
Figure 6E:
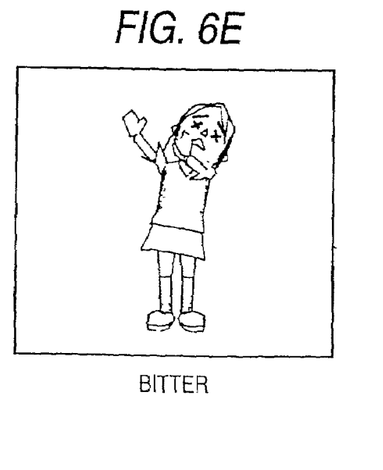
Figure 7A:
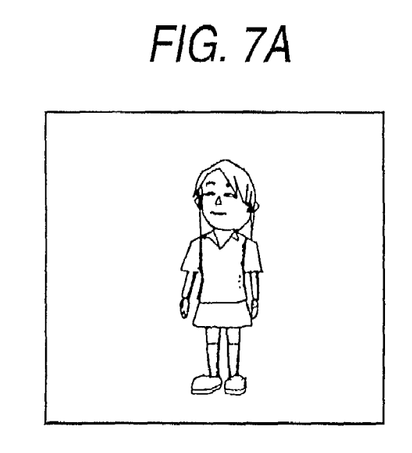
FIGS. 7A to 7C are schematic diagrams illustrating additional examples of avatars displayed on the display 41.
Figure 7B:
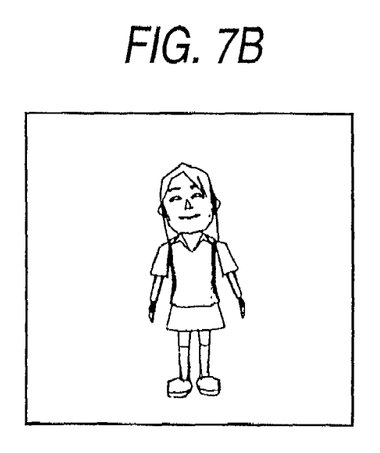
Figure 7C:
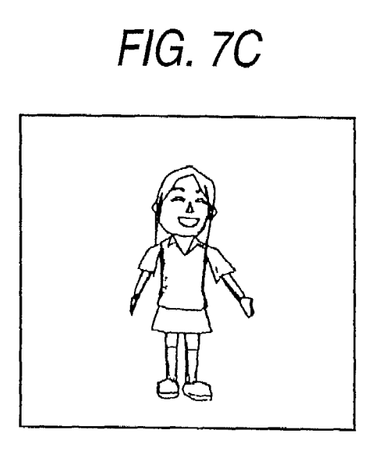
Figure 8A:
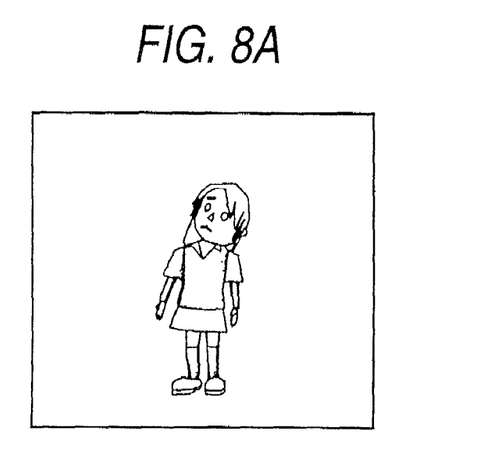
FIGS. 8A to 8C are schematic diagrams illustrating additional examples of avatars displayed on the display 41.
Figures 8B, 8C:
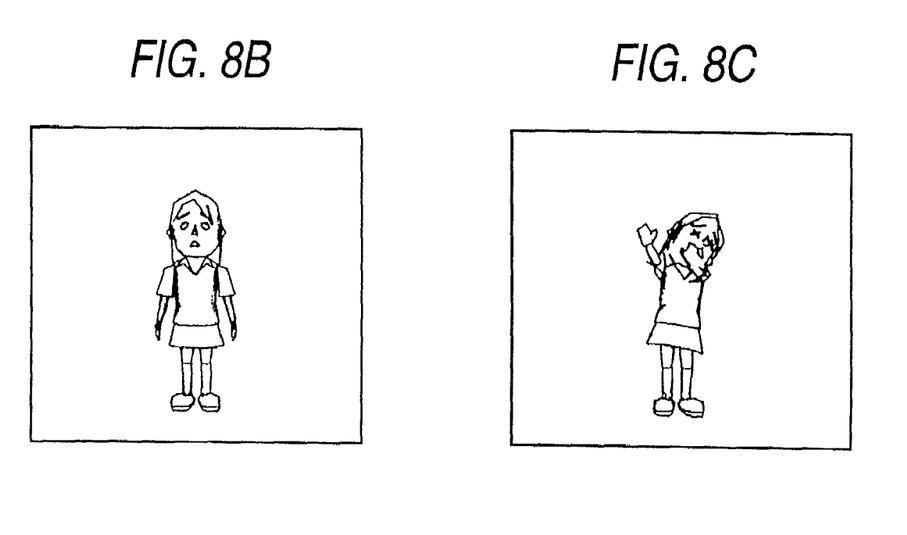

FIGS. 7A to 7C show expressions of the avatar when the different levels are set to the condition "glad," and FIGS. 8A to 8C show expressions of the avatar when the different levels are set to the condition "bitter." As described above, plural avatars are prepared that have various expressions based on every different condition and level for one kind of avatar. In FIGS. 6A to 8C, the avatars are expressed by still pictures, however, they actually make motions. For example, the condition is set to "glad" and the level is set to "very," the avatar expresses "very glad" with a motion picture achieved by continuously repeating a hand-up state as shown in FIG. 6D and a hand-down state as shown in FIG. 7C.

When the user checks the buttons and the terminal is allowed to carry out a chat or the like in the virtual space, the condition input window 51 shown in FIG. 5 is displayed in a scale-down style at a predetermined position on the display 41, whereby the user is allowed to check the buttons (vary the expression of the avatar) during the course of the chat or the like.

Figure 9:
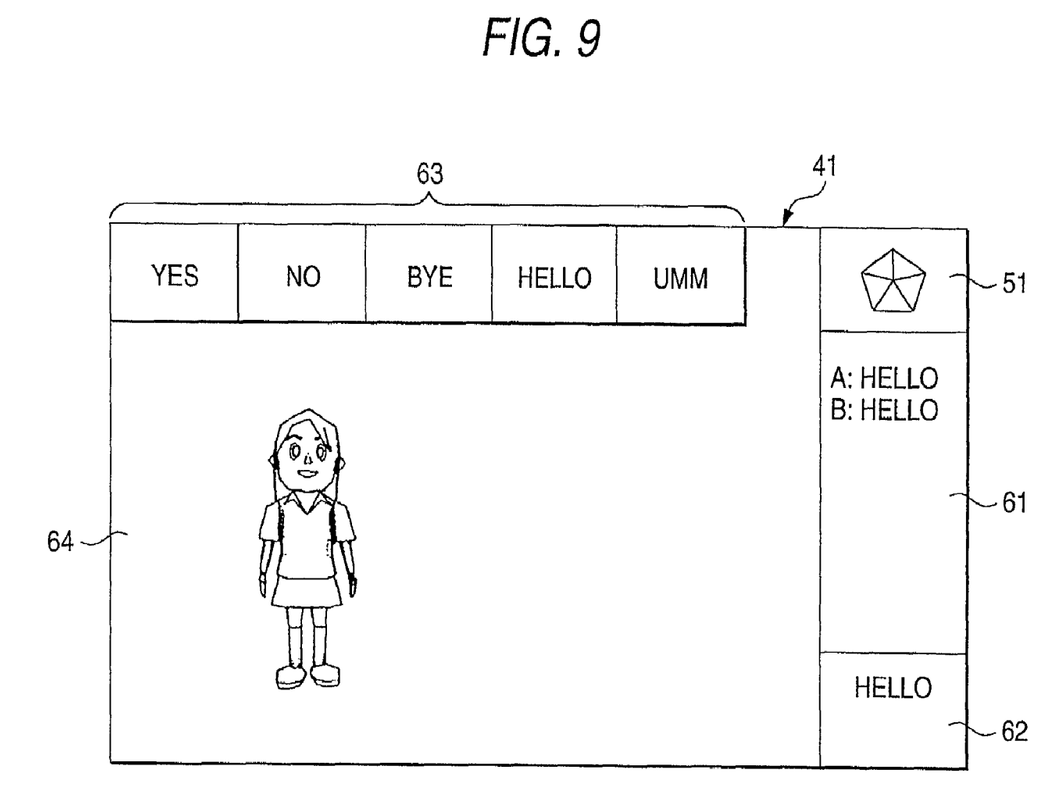
FIG. 9 is a schematic diagram showing an example of an avatar displayed on the display 41.

FIG. 9 is a diagram showing a state where the condition input window 51 is displayed in small size on the upper right corner of the display 41. Below the condition input window 51, a chat display portion 61 for displaying the chat content being carried out and a chat input portion 62 in which an input result of text data to be transmitted to a chat partner through the chat is displayed.

Action buttons 63 are provided at the upper side of the display 41. Upon operating one of the action buttons 63, the word corresponding to the action button 63 thus operated, for example, a word "hello" when the action button 63 "HELLO" is operated is uttered from a speaker (not shown) as the output portion 17 of the terminal 1 of the chat partner side (another avatar facing the self avatar).

Speech based on the operation of the action button 63 is made with different tones in accordance with the condition and level set from the condition input window 51. For example, for even the same word "hello," it is uttered gladly when the condition is "glad," and also it is uttered bitterly when the condition is "bitter". Further, for the same word "glad," it is uttered with different tones when the level is "a little," "normally" and "very."

An avatar display portion 64 is provided at the lower side of the action buttons 63. The contents to be displayed on the avatar display portion 64 may be set by the user. However, the avatar of the user himself/herself, other avatars and the background of the virtual space are mainly displayed. When the button of the condition input window 51 is operated on such a display frame, the display (expression) of the avatar displayed on the avatar display portion 64 (the corresponding avatar displayed on the self terminal 1 and the other terminals 1) is switched.

Figure 10:
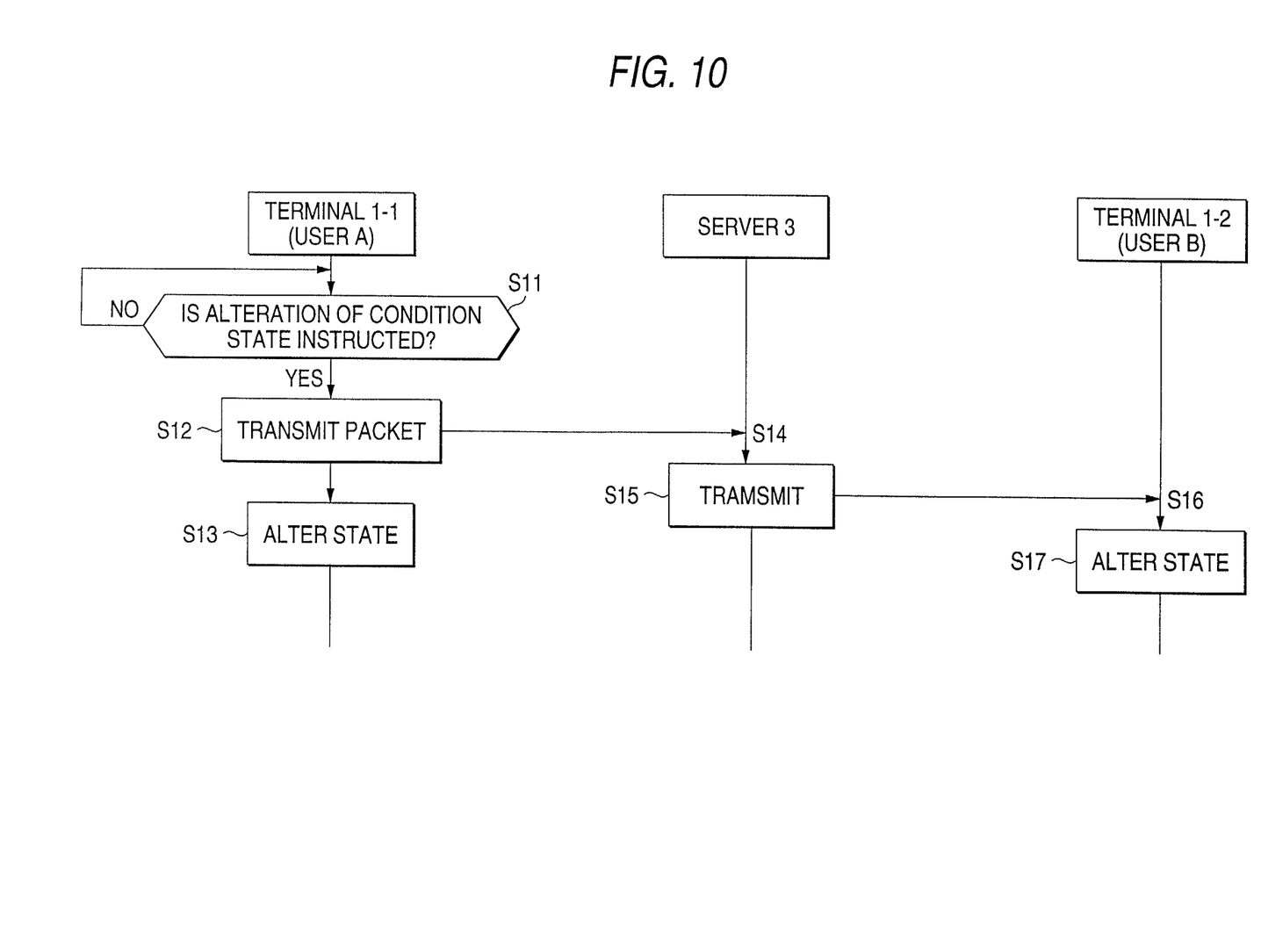
FIG. 10 is a flowchart showing the operation to change the feeling expression of an avatar.

Such an operation carried out in the system shown in FIG. 1 will be described with reference to the flowchart of FIG.

10. In the following description, it is assumed that the user A of the terminal 1-1 and the user B of the terminal 1-2 exist in the same virtual space and carry out a chat with each other. In step S11, the terminal 1-1 judges whether the button of the condition input window 51 is operated or not (i.e., whether an alteration of the condition state is instructed or not). The processing of the step S11 is repeated until it is judged that the alteration of the condition state is instructed, and the processing goes to step S12 when the alteration of the condition state is instructed.

In step S12, transmission of packets is carried out. The packets to be transmitted contain information on alteration of the condition state. The condition state is managed by a state table as shown in FIG. 11 which is developed in RAM 13 (FIG. 2), for example.

Figure 11:
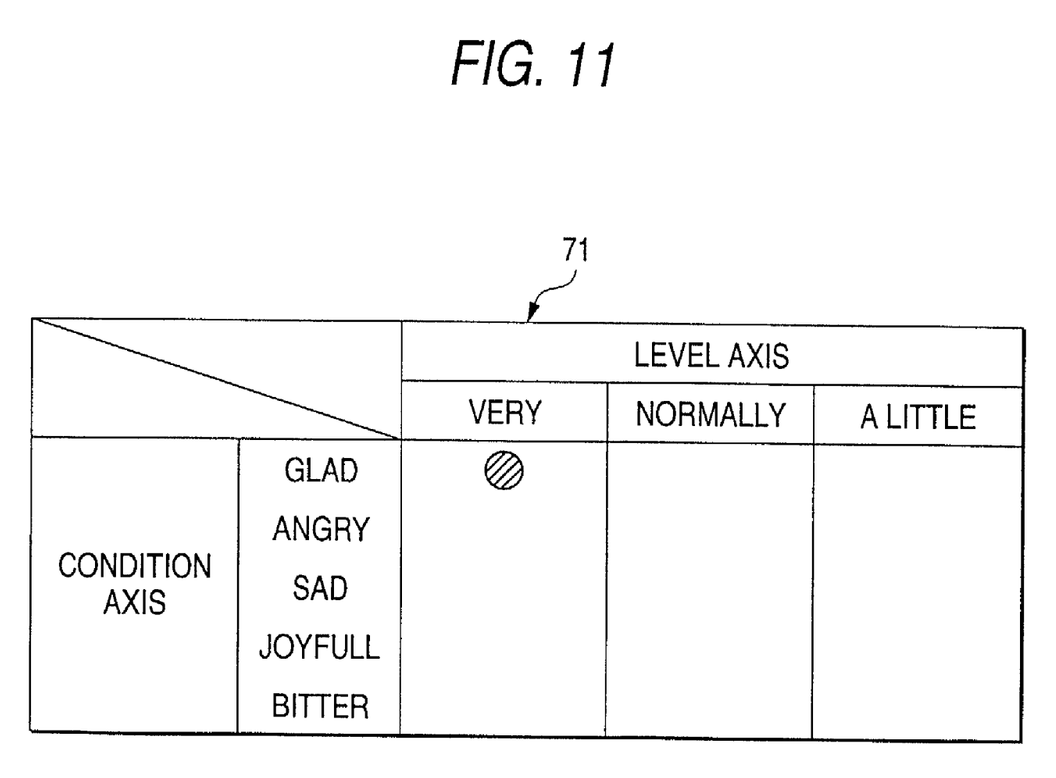
FIG. 11 is a diagram showing a state table 71.

FIG. 11 is a diagram showing an example of the state table. The state table 71 is constructed with a condition axis and a level axis so that the condition input window 51 and the state table 71 are in association with each other. That is, in this case, the condition axis is constructed with the five conditions of "glad," "angry," "sad," "joyful" and "bitter," and the level axis is constructed with the three levels of "very," "normally" and "a little."

In this case, the state table 71 includes the five conditions and the three levels for each condition, and thus it manages fifteen total kinds of feelings. For example, these feelings are managed by setting a flag to one kind of feeling in these feelings, and that feeling is set as a current feeling by the user.

The state table 71 as described above is managed by each terminal 1. That is, each terminal 1 manages both the state table 71 of the self avatar (pilot avatar) and the state tables 71 of the other user's avatars (drone avatars). Further, each terminal 1 holds the data of the avatars corresponding to the feelings, and when a feeling is indicated, each terminal 1 carries out the processing operation (display) based on the data of the avatar corresponding to an indicated feeling.

Accordingly, in step S12, only the information on the feeling after an alteration is made is transmitted through the network 2 to the server 3. For example, the respective feelings in the state table are managed on the basis of identifiers for identifying the respective feelings, and each identifier is transmitted as the corresponding feeling to the server 3. In step S14, the server 3 receives a packet containing information on the feeling after the alteration from the terminal 1-1, and transmits (transfers) the information based on the packet to the terminal 1-2 in step S15.

In step S15, the target terminals 1 to which the packet is to be transmitted are all the terminals 1 in which the avatar corresponding to the terminal 1-1 (user A) exists as a drone avatar. The terminal 1-2 receiving the packet from the server 3 in step S16 renews the state table 71 in step S17.

As described above, each terminal 1 manages the state table 71 of the pilot avatar and the state tables 71 of the drone avatars. Accordingly, the terminal 1-2 receiving the packet renews the feeling of the state table 71 of the corresponding drone avatar based on the information of the feeling contained in the packet (for example, identifier), and further reads out the data of the avatar corresponding to the feeling thus renewed to start display of the avatar based on the data thus read out.

The renewal of the state table as described above is carried out on not only the drone avatars in each terminal 1, but also the state table corresponding to the pilot avatar serving as the self avatar managed by the terminal 1-1. That is, the terminal 1-1 transmits the packet in step S12, and also renews the state table in step S13.

In the foregoing description, the data of the avatars corresponding to the feelings have been already stored in each terminal, and the avatar's feeling can be altered by merely transmitting/receiving a packet containing the data indicating the feeling such as an identifier. However, the data of the packet to be transmitted/received may contain the data of the avatar itself.

Figure 12:
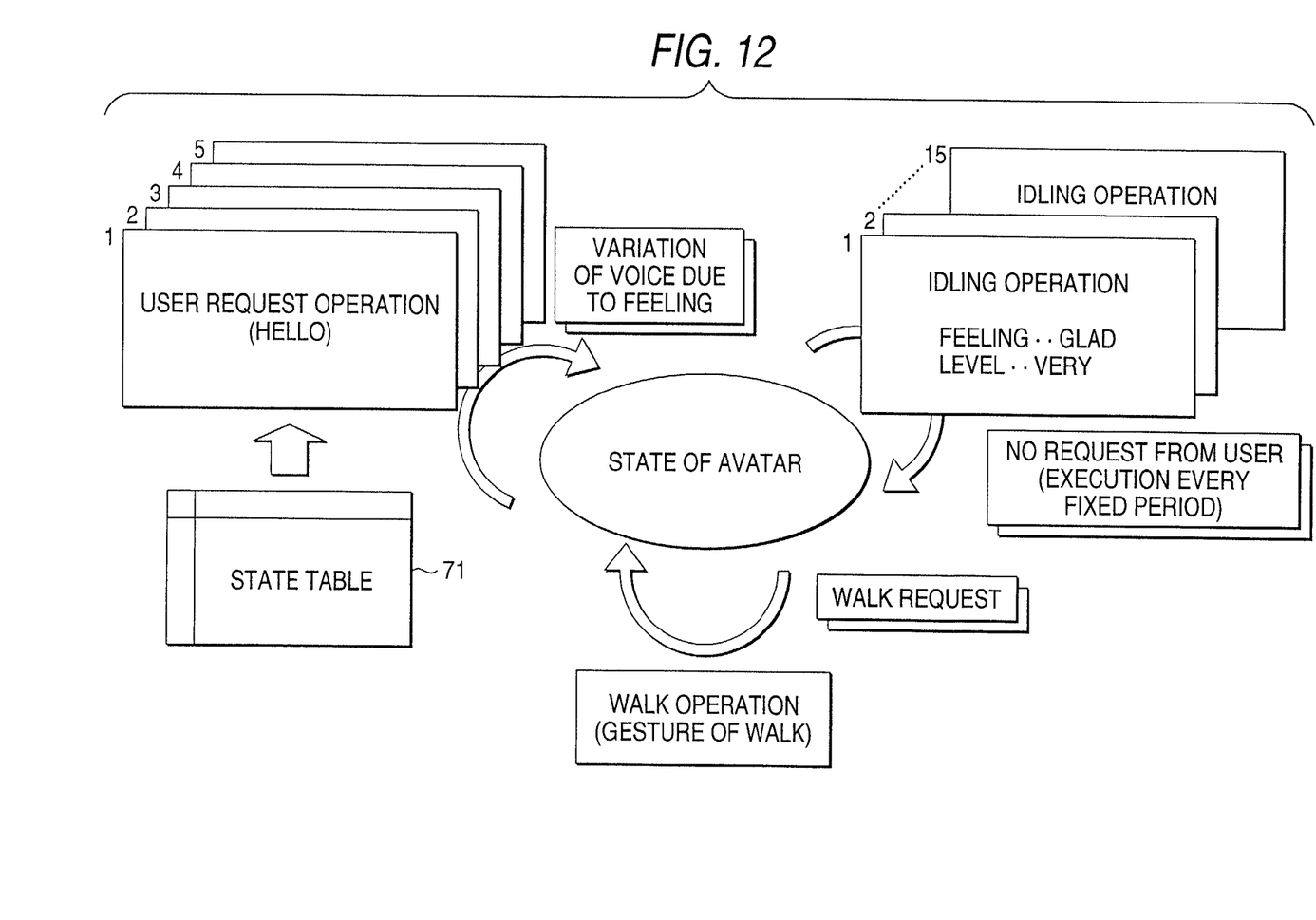
FIG. 12 is a diagram showing the state of an avatar.

As described above, the alteration of the avatars which can carry out the feeling expressions is managed. The terminal 1 manages not only the alteration of the feelings of the avatars, but also various actions of the avatars. Referring to FIG. 12, when non-alteration of the feeling is set as the state of an avatar, the feeling expression set by the user is executed as an idling action every fixed period. In this case, the fifteen kinds of feelings are set and thus the data of fifteen kinds of idling actions are stored in the terminal 1.

Specifically, the idling action means that in such an animation the hand-up and hand-down actions are repetitively carried out when the feeling is indicated as "joyful." Furthermore, during the idling operation, a chat is mainly carried out.

The avatars are designed to be movable in the virtual space. Accordingly, there is a case where an avatar is required to walk in the virtual space by an instruction from a user. In such a case, the state of the avatar is shifted to a walking action, and the walking action is repeated until the walking request from the user is released.

Moreover, the actions carried out by an avatar when the action buttons 63 (see FIG. 9) are operated contain special actions. In this case, the five buttons are provided as the action buttons 63, and when one of the action buttons 63 is operated, the state of the avatar is shifted to the operation associated with the action button 63 operated by the user (specifically, an utterance following a variation of a voice due to a feeling).

As described above, the actions carried out when the action buttons 63 are operated are carried out on the basis of the conditions (feelings, body conditions) set from the condition input window 51 by the user (on the basis of the information of the state table 71). As described above, according to this embodiment, visually-recognizable information based on avatars and acoustically-recognizable information are supplied as information on feelings of the users.

Figure 13:
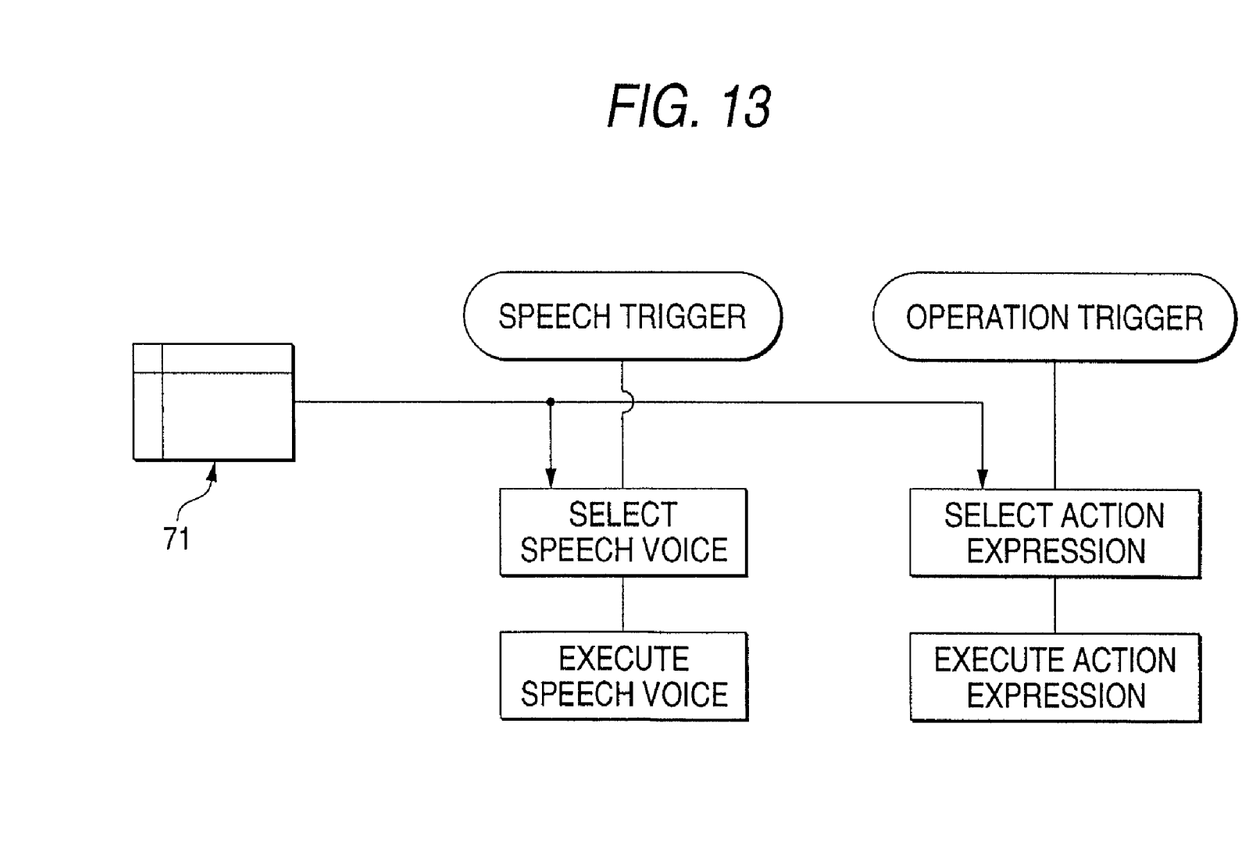
FIG. 13 is a flow chart showing the speech and operation triggers of the avatar.

Referring to FIG. 13, the same processing is carried out on the pilot avatar and the drone avatars being managed in terminal 1. When the action button 63 such as a speech trigger is operated, the feeling of the corresponding avatar is referred to from the state table 71 to select the speech voice, and the speech voice is executed on the basis of the selection.

Likewise, in the case of the idling action being an action trigger, when the feeling of the corresponding avatar is referred to from the state table 71 to select an action expression, the action expression (idling action) is carried out on the basis of the selection.

As described above, by enabling the avatars existing in the virtual space to perform feeling expressions, erroneous recognition of feelings can be reduced for communications in the virtual world (virtual space) and smooth communication can be carried out. Further, the chats or communications in the virtual world can be made more natural and joyful by using the feeling expressions which are achieved visually and acoustically. Also, social skill is enhanced (education of communications) by using this technique.

By standardizing the state tables described above like "very" "glad" is set to "1," "very" "angry" is set to "2," etc., the technique can be used as a frame model for feeling control/transmitting parts.

In the above-described embodiment, the user inputs (sets) his/her feeling from the condition input window 51. However, the user may input his/her feeling by using another method. For example, a mouse may be provided with a function of detecting information on a living body such as the amount of perspiration or heart rate, and judge and set the feeling of a user based on the data detected by the function. Furthermore, variation of face images of a user may be picked up by a camera or the like to analyze the variation of the facial expressions of the user and set the condition of the user.

In addition, the feeling expressions of the avatars may be made more diverse by dynamically varying the look and action of each avatar. Furthermore, data for feeling expressions may be added to non real-time communications such as an electronic mail, etc. In this case, the feeling of a user at the time when an electronic mail is created can be transmitted to a chat or communication partner.

The above-described series of processing can be executed either by hardware or by software. When the series of processing is executed by software, the programs constituting the software are installed from a recording medium into a computer installed in exclusively-used hardware or in a general personal computer which can execute various functions by installing various programs in the personal computer.

As shown in FIG. 2, such a recording medium is constructed by using a package medium having a magnetic disk 31 (containing floppy disk), an optical disk 32 (containing CD-ROM (Compact Disk-Read Only Memory), DVD (Digital Versatile Disk)), a magnetooptical disc 33 (containing MD(Mini-Disk)), a semiconductor memory 34 or the like in which the programs are recorded and which is distributed to supply the programs to users separately from personal computers. However, a hard disk containing ROM 12 or a storage portion 18 stored with the programs, which is supplied to a user under the state that it is installed in a computer, can also be used.

In this specification, the steps describing the programs supplied from the recording medium contain not only a series of processing that is carried out time-sequentially according to the description order, but also a series of processing that is not necessarily carried out time-sequentially, but carried out in parallel or individually.

Furthermore, in this specification, the system refers to the overall apparatus that includes plural devices.

As described above, according to the information processing device, the information processing method and the recording medium of the present invention, the data on images of the object corresponding to a user which are associated with the data of the feelings of the object are stored, and the display of the object is controlled based on the data thus stored, so that the feeling expressions are brought to the object, and the communications in the virtual space can be smoothly performed.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An information processing system, comprising:
a detection device configured to detect living body information from a user, the detection device configured to provide detection data based on the detected information;
a manager electrically coupled to the detection device and configured to receive the detection data, the manager configured for managing data on feeling expressions of an avatar which correspond to the detected data relating to the user, wherein said feeling expressions include:
a plurality of state conditions; and
a plurality of levels associated with each of the plurality of state conditions,
wherein each of the feeling expressions are based on at least one of the plurality of state conditions and one of the plurality of levels;
a storage area for storing data on image displays of the avatar which correspond to the feeling expressions; and
a display controller for controlling the image displays of the avatars based on the data stored in the storage area.

2. An information processing system as claimed in claim 1, wherein the avatar exists in a virtual space constructed on a network, and the data on the feeling expressions is set when the user enters the virtual space.

3. An information processing system as claimed in claim 1, wherein the data managed by the manager is set in accordance with information detected from the user, the information being selected from the group consisting of: heart rate and amount of perspiration.

4. An information processing system as claimed in claim 1, further comprising a voice controller for controlling a tone of voices uttered from the avatar based on the data stored in the storage area.

5. An information processing system as claimed in claim 1, wherein the manager manages the data on the feeling expressions based on a table in which the state conditions and the levels thereof are associated with one another to define a packet.

6. An information processing system as claimed in claim 1, wherein the display controller controls a display including a motion picture of the avatar.

7. An information processing device as claimed in claim 1, wherein a walk-through environment is provided to a user in the virtual space.

8. An information processing method for enabling a plurality of users to participate as respective avatars in a virtual space constructed on a network and to have conversations with other users, the method comprising the steps of:
detecting image information on relating to a user;
managing data on feeling expressions of an avatar which correspond to the detected image information relating to the user, wherein said managing data includes:
a plurality of state conditions; and
a plurality of levels associated with each of the plurality of state conditions,
wherein each of the feeling expressions associated with the avatar is based on at least one of the plurality of state conditions and one of the plurality of levels;
controlling storage of data on image displays of the avatar which correspond to the feeling expressions; and
controlling the image displays of the avatar based on the storage of data on the image displays.

9. An information processing method as claimed in claim 8, further comprising the step of controlling the data on the feeling expressions of the avatar based on voices uttered by the avatar.

10. An information processing method as claimed in claim 8, wherein a walk-through environment can be controlled by a user in the virtual space.

11. A recording medium in which an information processing program is stored for executing steps to enable a plurality of users to participate as respective avatars in a virtual space constructed on a network and to have conversations with other users, the information processing program comprising the steps of:
   detecting living body information from a user with a detection device;
   providing detection data based on the detected living body information;
   managing data on feeling expressions of an avatar which correspond the detected living body information, wherein said feeling expressions include:
      a plurality of state conditions and a plurality of levels associated with each state condition,
      wherein each of the feeling expressions are based on at least one of the plurality of state conditions and one of the plurality of levels;
   controlling storage of data on image displays of the avatar which correspond to the feeling expressions; and
   controlling the image displays of the avatar based on the storage of data on the image displays.

12. A recording medium as claimed in claim 11, wherein a walk-through environment can be controlled by a user in the virtual space.

13. A program for executing functions in a virtual space constructed on a network in which a plurality of users participate as respective avatars and have conversations with other users, the program comprising the functions of:
   a managing function for managing data controlling feeling expressions generated for an avatar wherein the feeling expressions correspond to the conditions detected on the living body information of a user, and wherein said managing data includes at least one state condition and at least two levels associated with each of the at least one state conditions, wherein each of the feeling expressions are based on at least one of the conditions and one of the levels;
   a storage control function for controlling storage of data on image displays of the avatar which correspond to the feeling expressions; and
   a display control function for controlling the image displays of the avatar based on the storage of data on the image displays.

14. A program as claimed in claim 13, wherein a walk-through function is provided to a user in the virtual space.

15. A character device used in connection with a communication terminal device which jointly uses a virtual space with other communication terminal devices, the character device comprising:
   an image input device, the device provided with a function of detecting information on a living body;
   communication parts for transmitting and receiving control commands to vary at least one of expressions of the character device and voices uttered by the character device, wherein said control commands include one of a plurality of state conditions and a plurality of levels associated with each of the plurality of state conditions, wherein each of the feeling expressions are based on at least one of the conditions and one of the levels; and
   a controller for respectively controlling the expressions of the character device and the voices uttered by the character device based on the control commands received by the character device.

16. A character device as claimed in claim 15, wherein the expressions and voices of the character device are controlled based on living body information of a user that enters the virtual space.

17. A character device as claimed in claim 16, wherein one of an image display and voices are controlled by receiving data on the character device which are associated with the living body information.

18. A character device as claimed in claim 15, wherein the expressions and voices of the character device are controlled by receiving data on variations of the user's expressions which result from communications in the virtual space.

19. A character device as claimed in claim 15, wherein the controller controls action of the character device.

20. A character device as claimed in claim 15, wherein said controller respectively controls the walk function of the character device.

21. A virtual space information processing system for controlling the display of an avatar, the system comprising:
   a detection device configured to collect living body information regarding a user;
   a condition manager communicatively coupled to the detection device to receive the collected living body information, the condition manager configured to store a plurality of state conditions corresponding to the collected living body information wherein each of the plurality of state conditions includes a plurality of levels;
   a feeling expression generated in response to one of the plurality of state conditions and one of the plurality of levels corresponding to the collected plurality living body information; and
   a data storage device for storing graphical data of the avatar that correspond to the generated feeling expression.

22. A system as claimed in claim 21 further comprising a display controller generating a visually perceptible image based on the stored graphical data of the avatar.

23. A system as claimed in claim 21, wherein the detection device is a digital camera configured to record expression information from the user.

24. A system as claimed in claim 21, wherein the detection device is an information input device configured to detect the user's pulse or perspiration.

25. A system as claimed in claim 21, wherein the condition manager includes a state table for correlating the plurality of state conditions corresponding to the collected plurality of user information with the plurality of levels.

26. A system as claimed in claim 25, wherein the state table generates a packet representative of the feeling expression.

27. A system as claimed in claim 26 further comprising:
   a first terminal configured to generate a first avatar, and wherein the first terminal includes a first state table configured to generate a first packet representative of a first feeling expression;
   a second terminal communicatively connected to the first terminal, the second terminal configured to generate a second avatar, and wherein the second terminal includes a second state table configured to receive the first packet; and
   a display controller configured to generate a visually perceptible image at the second terminal based on the first packet and the stored image data.

* * * * *